United States Patent Office 3,229,327
Patented Jan. 18, 1966

3,229,327
DEVICE FOR SEVERING LEGS FROM POULTRY
Thomas J. Brooks, The Bungalow, 11 The Mount,
Scraptoft, England
Filed Aug. 19, 1963, Ser. No. 302,996
4 Claims. (Cl. 17—11)

This invention relates to the art of packaging poultry.

A primary object is the creation of a machine to cater for the problem of severing the legs from poultry, for example turkeys or chickens, prior to their being packaged.

The invention is particularly visualised for use in processing stations where the birds are plucked and conveyed through various processing, e.g. scalding and cleaning, stages before being packed. For this purpose use may be made of a continuous conveyor on which the individual birds are hung feet downwards, and an object of the invention is a machine which can be positioned at a station following the plucking area and act positively on conveyed birds presented thereto, thereby severing the legs prior to a packing stage.

A further object is a device which is simple but effective for the prescribed purpose.

A substantial power may be required to sever the legs of many birds, and a further object of the invention is to provide for the exercise of the requisite cutting power without involving the use of bulky mechanism.

In fulfilment of these objects the present invention provides a severing machine comprising a fixed anvil and a cooperating knife blade, a mechanism for moving this knife blade to and from the anvil in performance of a severing operation, an air cylinder unit to operate the aforesaid mechanism, and a movable trip device arranged in the path of the legs of a bird presented between said blade and anvil and controlling an air valve governing the operation of said air cylinder unit.

The arrangement envisaged is that the legs of a bird, suspended from the aforementioned conveyor, can be presented in the gap between the knife blade and the anvil and, as they move into this gap, will operate the trip lever, and thereby the air cylinder unit, so as to bring about a short but powerful stroke of the knife against the anvil to sever the legs, which will then drop off into a convenient receptacle.

Advantageously, and with the object of acquiring a compact and readily transportable machine, the components of this machine referred to above are grouped into a unit comprising a casing carrying these components. In a successful form of the machine, the anvil is mounted at the lower part of the gap in the front wall of a casing which houses the movable knife blade and the said blade-moving mechanism and which has the air cylinder mounted thereon, the bird's legs being slid along the gap to operate a trip device disposed transversely of the said gap.

With this arrangement, the trip device may include a rod or arm which is pivotable relatively to the casing to actuate the air valve, which is also mounted on this casing, and this rod has an extension which lays athwart the aforesaid gap and is adjustable in position along the length of this gap. This arrangement enables the point along the knife blade at which the severance takes place to be varied, thereby allowing for equalisation of the wear on this blade.

The casing, again, may be equipped with a mounting piece which is adjustable to enable the head (represented by the casing and the parts of the machine carried thereby) to be set at varying angles to an upright support. By this means it is possible to adjust the height and attitude of the knife/anvil assembly to suit it to particular conditions of use, e.g. to adjust to different sizes and kinds of poultry, to take account of varying plant conditions, and so on.

The blade moving mechanism can be of various forms, but advantageously comprises, in principle, a toggle linkage pivotable about a fixed pivot at one end, having the knife blade carried at the other end and guided in its movement by a swing lever, and having the thrust of the piston of the air cylinder unit applied to the pivot joint of the linkage. This particular toggle construction can be used to produce a direct, powerful and guided stroke of the knife which will be effective in severing even tough legs and will nevertheless be quickly-acting.

A form of the severing machine according to this invention is illustrated by way of example in the accompanying drawings, in which.

Figure 1:
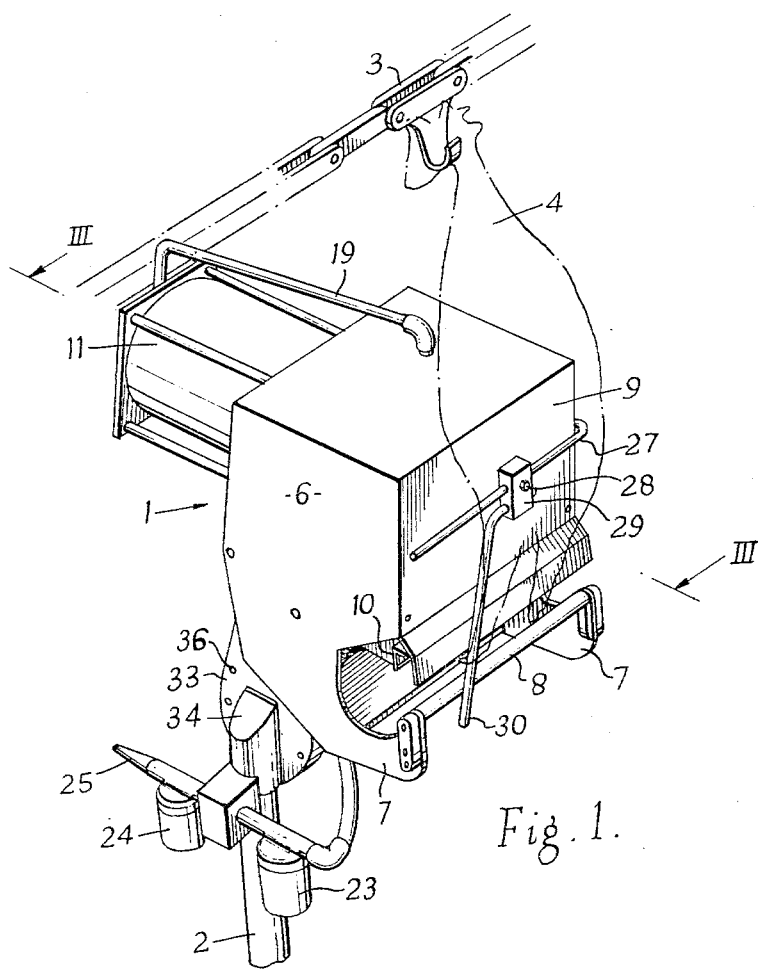
FIGURE 1 is a perspective illustration of the device in use.
Figure 2:
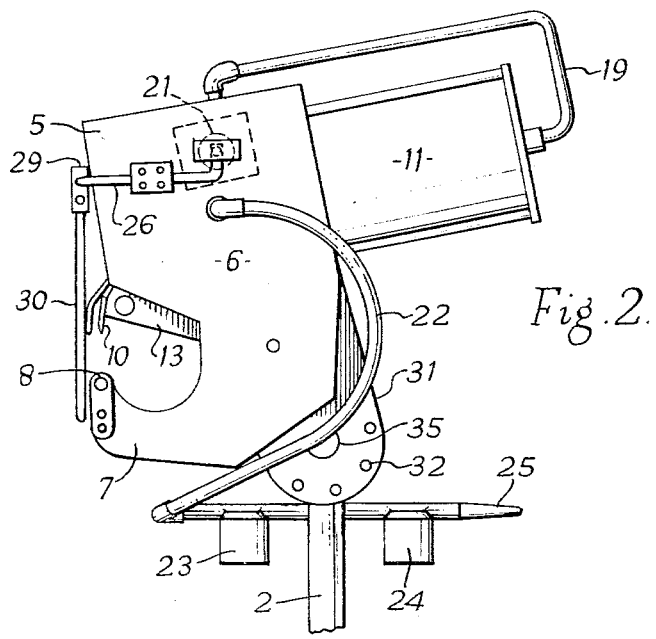
FIGURE 2 is an end view of the same.
Figure 3:
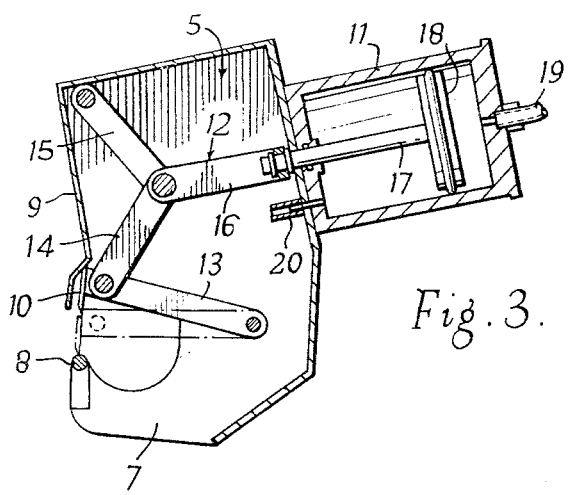
FIGURE 3 is a vertical cross section on the line III—III of FIGURE 1 as seen in the direction of the arrows of that figure with parts being omitted.

The machine illustrated has a head generally designated 1 which is mounted at a level convenient to an operative on a post 2 in what is here assumed to be a poultry packaging plant. Thus, for the purposes of illustration, FIGURE 1 indicates a chain conveyor 3 which is assumed to run above the head 1 carrying birds to be packaged; one of these has been indicated in phantom at 4.

The head 1 basically comprises a hollow casing 5, the side plates 6 of which are recessed at their lower parts and provided with forwardly projecting arms 7 between which is secured a bar 8 forming a cutting anvil. Disposed above this anvil in a gap provided in the lower part of the front wall 9 of the casing is a knife 10 which is movable to cooperate with the anvil 8 in severing the poultry legs, being operated by an air cylinder 11 through a toggle linkage 12.

Thus, it will be observed that the blade 10 is carried by the front ends of a pair of parallel arms 13 which are pivotally mounted within the casing 5 at the two sides of the latter, and is capable of being moved up and down through pairs of toggle levers 14 and 15, which are respectively hinged at their outer ends to the arms 13 and to the corresponding side walls 7 of the casing. At their adjacent and overlapped inner ends, the respective pairs 14 and 15 of toggle levers are pivoted to a common link 16, and the two links 16 are coupled to the piston rod 17 of the air cylinder 11. This arrangement enables the knife 10 to be brought down against the anvil 8 with a very powerful stroke.

The chambers at the two sides of the piston 18 in the cylinder 11 are connected through pipes 19 and 20 to a three-way valve 21 (not shown in detail in the drawings because it is of standard construction) which is also connected up through an exhaust port to atmosphere and through a flexible pipe 22, and through lubricating and filter chambers 23 and 24 to a nozzle 25 which can be connected to any convenient source of compressed air, such as a compressor.

The valve element in valve 21 is adapted to be changed over by an operating rod 26 which is disposed externally of the corresponding side wall 6 of the casing 5 and has its leading end 27 bent round and along the exterior of the front wall 9 of this casing. Slidable on the rod section 27 and adjustable therealong by a set screw 28 is a block 29 carrying a depending rod 30 which is thereby disposed immediately in front of, and athwart, the gap between the knife 10 and anvil 8.

The arrangement therefore is that when the legs of a bird 4 are presented to this gap and forced along it, they will move the rod 30 thereby to actuate the valve 21. The result of this is to admit an air impulse through pipe 19 to the rear chamber of cylinder 11, thereby to operate the toggle linkage 12 and bring down the knife in performance of the leg-severing operation. At the same time the front chamber of the air cylinder will be vented to atmosphere through pipe 11 and valve 21. When the legs are severed and the thrust on rod 30 ceases, the latter will return to its original position, so changing over the valve and admitting pressure to the front chamber of cylinder 11, thereby to re-set the piston 18 and wthdraw the knife 10 ready for the next operation.

The fact that the rest position of the rod 30 is adjustable along the length of the knife 10, enables the section of the length of this knife actually effective in any cutting operation to be varied. This will enable the wear which inevitably occurs on the knife edge to be distributed along the length of the latter when the machine has been in use for a substantial period.

It will also be noted from the drawings that the casing 5 incorporates a depending mounting web 31 which is of part-circular shape at its lower end and there provided with fastening holes 32. Cooperating with this curved lower end of the web is a circular mounting plate 33 having a cap portion 34 which fits over the supporting post 2. This plate 33 has a stub shaft 35 which passes into web 31, and plate 33 is also provided wtih a series of holes 36 which are capable of registering with the holes 32, thereby to fasten the two elements together against relative rotation by the insertion of locating pins, nuts and bolts or the like. This arrangement enables the attitude, i.e. the angle of inclination, of the head 1 to be adjusted to suit variable dispositions of the device in a packing plant, to lower the head for greater convenience in dealing with different sizes of oncoming birds, and so on.

The post 2 may take various forms, and preferably will be equipped at its lower end with a stand so that its site can be changed at required times. It may, in fact, surmount and be attached to a receptacle into which the severed legs of the birds may fall as a result of the severing operation.

Although this toggle mechanism represents a preferred form of the mechanical transmission between the air cylinder and the knife it will be appreciated that other forms can be employed within the scope of this invention.

Again, the direction of travel of the knife blade can be arranged to suit the particular lay-out of the conveyor and the attitude in which the bird can most conveniently be presented to the severing device.

I claim:

1. A machine for cutting feet from the legs of poultry which comprises means providing a cutting zone, a cutting anvil in said cutting zone, reciprocating cutting blade means operatively associated with said anvil for severing the feet from the legs of poultry in said cutting zone, means for reciprocating said cutting blade means, an air cylinder unit for operating said cutting blade reciprocating means, an automatic trip means positioned adjacent said cutting zone operatively engaged by the poultry moving into the cutting zone which actuates said air cylinder unit for operating said cutting blade reciprocating means.

2. A machine for cutting feet from the legs of poultry which comprises means providing a cutting zone, a cutting anvil in said cutting zone, reciprocating cutting blade means operatively associated with said anvil for severing the feet from the legs of poultry in said cutting zone, a mechanism to reciprocate said cutting blade means, an air cylinder unit for operating said mechanism, an air valve governing said air cylinder unit, an automatic trip means operatively engaged by the poultry moving into the cutting zone for operating the air valve which actuates said air cylinder unit thereby operating said mechanism to reciprocate said cutting blade means.

3. A machine as set forth in claim 2 wherein said mechanism comprises a toggle linkage which is operatively connected to said air cylinder unit for reciprocating said cutting blade means.

4. A machine as set forth in claim 2 in which the automatic trip means comprises a member which is adjustable longitudinally of said anvil.

References Cited by the Examiner
UNITED STATES PATENTS

| 2,417,890 | 3/1947 | Staufenbiel | 17—12 |
| 2,644,194 | 7/1953 | Fill | 17—23 |
| 2,795,816 | 6/1957 | Spang et al. | 17—32 |
| 3,115,667 | 12/1963 | Lis et al. | 17—11 |
| 3,137,892 | 6/1964 | Best et al. | 17—11 |

References Cited by the Applicant
UNITED STATES PATENTS

| 2,672,930 | 3/1954 | Iffland. |
| 2,912,563 | 11/1959 | Schlieker. |

FOREIGN PATENTS 70,934   8/1915   Austria.

SAMUEL KOREN, *Primary Examiner.*

LUCIE H. LAUDENSLAGER, *Examiner.*